Figure 1:
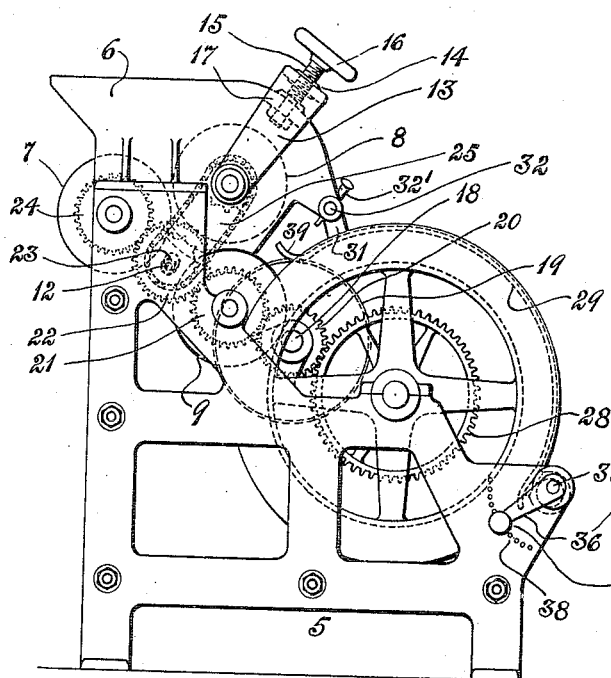

G. E. GOWDY.
MACHINE FOR FORMING PLASTIC MATERIAL.
APPLICATION FILED FEB. 15, 1909.

971,884.

Patented Oct. 4, 1910.

Witnesses:
E. B. Anderson
E. R. Youngs

Inventor:
George E. Gowdy
By his Attorneys,
Sutherland & Anderson

UNITED STATES PATENT OFFICE.

GEORGE E. GOWDY, OF NEW YORK, N. Y.

MACHINE FOR FORMING PLASTIC MATERIAL.

971,884.     Specification of Letters Patent.     Patented Oct. 4, 1910.

Application filed February 15, 1909. Serial No. 477,995.

*To all whom it may concern:*

Be it known that I, GEORGE E. GOWDY, a citizen of the United States, residing at New York city, in the county of New York and State of New York, have invented certain new and useful Improvements in Machines for Forming Plastic Material, of which the following is a specification.

This invention relates to machines for forming plastic material and a machine involving my invention can be used with advantage in many different connections although it is of particular utility when employed for shaping dough into a body suitable for making a roll or the like.

One of the more important features of the invention is the production of simple and effective means for forming a sheet of dough or equivalent substance into a coiled body so that it can be more readily compressed to make the final product which is a mass of dough suitable for baking to present either a roll or a loaf. In the present instance my machine comprises a drum or cylinder and a compression plate which coacts to compress said coiled body and said compression-plate is preferably mounted over the drum so as to present a guard therefor to prevent flour, dirt and other particles falling onto said drum. In addition to this the plate can be more easily manipulated to obtain access to the drum for cleaning and other purposes.

In the drawings accompanying and forming part of the present specification I illustrate in detail one simple and convenient form of embodiment of the invention which to enable those skilled in the art to practice said invention will be fully explained in the following description while the novelty of the invention will be included in the claims succeeding said description.

Figure 2:
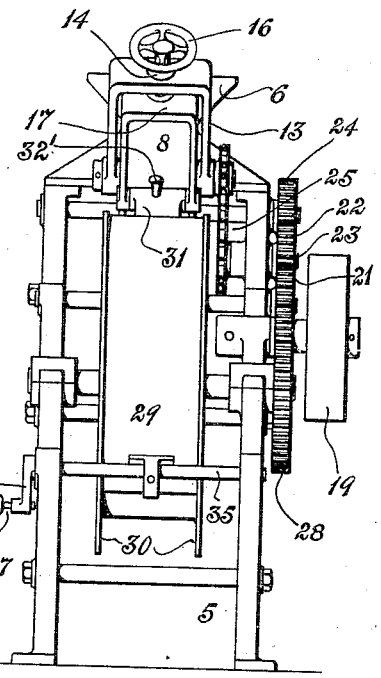
Figure 3:
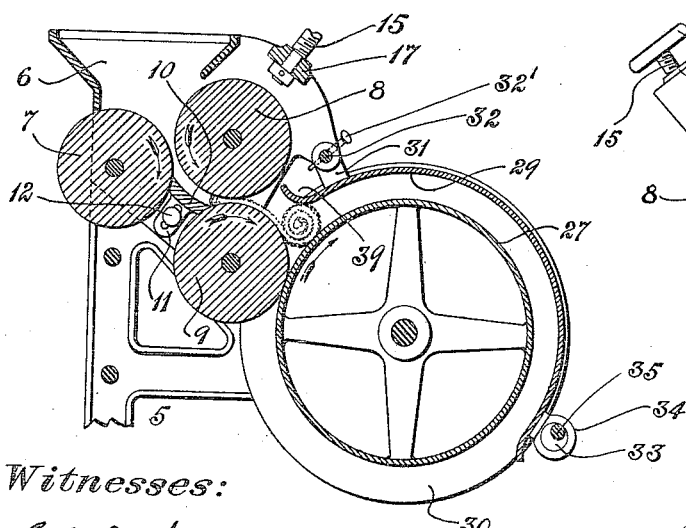
Figure 4:
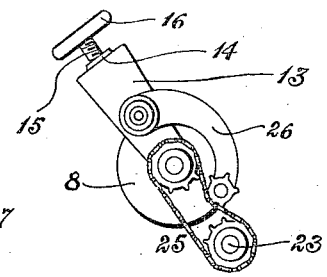

Referring to said drawings, Figure 1 is a side elevation of a machine for forming plastic material, involving my invention. Fig. 2 is a front elevation of said machine. Fig. 3 is a vertical sectional view of the upper portion of the same, and, Fig. 4 is a detail hereinafter more particularly described.

Like characters refer to like parts throughout the several figures.

The different parts of the machine may be supported in any desirable manner; for instance by a framework such as that denoted in a general way by 5 and which may as represented consist of two side members suitably tied together and spaced the requisite distance to receive between them certain of the operative parts.

As will hereinafter appear the machine embodies a drum and a compression plate which coöperate to shape a coiled dough body into finished condition for baking and the necessary dough may be supplied from any suitable source, for instance by the hopper 6 supported preferably at the rear upper side of the framework 5. Coöperative with said hopper are three rolls 7, 8 and 9 illustrated as disposed in triangular order. There is a direct coaction between the rolls 7 and 8 while a similar office follows with respect to the rolls 8 and 9 as will hereinafter appear. It will be assumed that there is a batch of dough in the hopper 6 and that the rolls 7 and 8 are rotating oppositely as indicated by the arrows in Fig. 3. In such a case as this the dough is drawn between the bight of said rolls and is drawn forward thereby in the form of a relatively thin sheet. These two rolls conjointly advance said sheet toward the bight between the rolls 8 and 9 which also rotate oppositely the direction of movement of the roll 9 being also indicated by an arrow. Between the rolls 7 and 9 I prefer to position a support for the sheet, such a support being illustrated and being denoted by 10; said support may consist of a plate concaved on its upper surface.

As will hereinafter appear the roll 8 is adjustably mounted to adapt the machine to a wide range of results and I prefer also that the sheet supporting plate or member be also adjustably mounted so as to regulate with preciseness its contact or substantial contact with the peripheries of the rolls 7 and 9. For example the plate on its ineffective side may be provided with pendent lugs 11 having elongated slots to receive bolts or screws as 12 connected with the framework interiorly thereof.

The shafts of the rolls 7 and 9 are preferably supported by bearings on the framework while the shaft of the roll 8 is rotatively supported by the branches of a yoke 13 which is shown as straddling the hopper 6. To the cross bar of said yoke is connected a feed-nut 14 having a threaded connection with the feed-screw 15 shown as equipped at its outer end with a hand wheel 16 and as connected at its inner end by a swivel-joint with a cross bar or strut 17 connecting the sides of the framework 5. It therefore follows that by turning said hand-wheel the roll 8 can be bodily adjusted toward or from the sheet-supporting plate 10 or toward and from the space between the rolls 7 and 9 should such plate not be present.

The main shaft of the machine is designated by 18 being rotatively supported in some suitable manner by the framework and carrying a suitable driver as the pulley 19. Said main shaft is shown as provided with a fixed pinion 20 in mesh with a pinion 21 fixed to the shaft of the roll 9. The pinion 21 is shown as being in mesh with a pinion 22 fixed to a shaft 23, said pinion 22 in turn being in mesh with the gear 24 fastened to the shaft of the roll 7, the train of gears described serving as a convenient means for operating the rolls 7 and 9 from the main shaft. The shaft 23 is shown as connected by sprocket gearing denoted in a general way by 25 with the roll 8. The tension of the chain forming part of said sprocket gearing may be regulated simply through the links thereof or as shown in Fig. 4 a slack take up, such as a pivoted arm 26 may be provided to govern the tension of such chain.

As previously indicated the two rolls 7 and 8 coöperate in taking a mass of material from the hopper 6 and drawing the same forward in the form of a sheet. These two rolls positively feed or advance such sheet into the space between the rolls 8 and 9 which further advance the sheet onto the rotary drum 27.

The drum 27 is shown as supported by the framework 5 and its shaft may have a spur gear 28 in mesh with the pinion 20, by reason of which said drum or cylinder can be rotated oppositely to the final roll 9 of the series of three rolls. I have indicated by arrow the direction of movement of said drum. With said drum is operatively associated a compression plate as 29 which is mounted over the drum there being a space between the concave side of said plate, which it will be observed is approximately of semi-circular form, and the periphery of the drum through which the mass of dough is caused to travel by the positive feeding action of the said drum. This compression plate it will be perceived is mounted over the drum so that there is practically no tendency for particles of dirt and other substances lodging on or adhering to the active surface of said plate; as a matter of fact the dough as it traverses said surfaces sweeps the same clear of all undesirable matter and the same will pass clear thereof and not pocket therein. The sides of the drum 27 are furnished with flanges 30 between which the compression plate is located.

Prior to the time the dough travels between the drum 27 and compression plate 29 it is made into the form of a curled sheet in which condition it is advanced forward from the entering end of the compression plate toward and from the leaving or discharge end thereof, leaving the latter in a form ready for baking. The said compression plate is shown as having a lug 31 to removably receive a pivot pin 32 carried by the framework 5 and located just in advance of the roll 8, the pivot pin normally being held in working relation by a securing pin 32' which can be taken out after which the said pivot pin can be withdrawn to enable the said compression plate to be swung forward to obtain access to its under side or to the circumference of the drum 27. In the present case the said compression plate is adjustable to regulate the amount of compression or to secure a greater amount of compression at the discharge portion of said plate than at the entering portion thereof. From this it will be clear that the said compression plate is adjusted at or near its discharge end. For this purpose an eccentric 33 may be utilized said eccentric fitting a collar 34 exterior of said plate near its discharge end. The eccentric is shown as being rigid on a shaft 35 supported by bearings on the framework 5 and equipped with a handle or lever 36 by which said shaft 35 can be turned and thereby through said eccentric 33 move the outer or discharge end of said compression plate toward or from the periphery of the drum 27. The adjustment may be maintained in any suitable manner, for example by a spring-plunger 37 of well-known construction adapted to interchangeably fit perforations as 38 arranged in the framework 5 and on an arc struck from the center of motion of said shaft 35. When the compression plate is swung out of the way in the manner set forth it turns on said eccentric 33 as a pivot.

The rolls 8 and 9 as will be understood feed the batch in the form of a sheet onto the drum 27 and into the space between said drum and compression plate. It will be observed that the entering end of the working surface of said compression plate is somewhat rounded as at 39, the sheet being curled against this portion 39 and owing to the presence of the latter there is no possibility of the curled body being cut or otherwise injured.

It should be stated that the roll 9 is contiguous to the drum 27. By this I do not necessarily mean that these two parts travel in contact although they might do so but that there is such an adjacence thereof as will insure their direct coöperation in making the sheet into the form of a curled body. The rolls 8 and 9 are so placed with respect to each other and with relation to the drum 27, that the sheet of dough is preferably received onto said drum before said rolls 8 and 9 release or free the sheet from their grasp. When therefore the leading end of the sheet is fed onto said drum said sheet is still under the influence of the rolls 8 and 9 and the consequence will be that the sheet will be curled on itself, the operation continuing while the sheet is thus held. After the said rolls 8 and 9 free the sheet the drum continues to curl the sheet until the operation is fully completed at which point the curled body will be fed forward through the space between the compression plate 29 and drum 27, the feeding action being secured by said drum.

It will be apparent from what has been stated that the sheet of dough is fed onto the drum and that the latter initially curls the sheet; in fact the drum is the only factor that plays a part in the major portion of the curling or coiling operation although the inner portion of the compression plate aids in the final curling of the sheet or as a guiding means to maintain the curled form or to prevent the partially curled body from opening out. This provides a very simple construction.

I have described in full one form of embodiment of the invention for the stated purpose of enabling those skilled in the art to practice the invention. I do not restrict myself to the disclosure thus made for certain variations may be made within the scope of my invention as expressed in my claims.

As an illustration it is not essential that I employ several rolls at the entering end of the drum one of the broad features of the invention residing in a combination of drum and roll which conjointly act to form a sheet of dough or similar material into a curled body which can be subsequently compressed or densified by the action of the drum and compression plate to make the finished article whether it be for a loaf, a roll or otherwise. Preferably though not necessarily the surface speed of this roll and drum is the same and they are so related as to produce a pocket therebetween both of which facilitate the curling action of the sheet.

What I claim is:

1. A machine of the class described comprising a rotary drum, a rotary roller in contact with said drum to form a pocket and being adapted to feed a sheet of plastic material directly onto said drum and said drum serving to initially curl the sheet while in said pocket and a compression device disposed over and separated from the drum the space between said drum and compression device serving as a passageway for the curled body and the compression device being so located as to act on the curled body as soon as coiled.

2. A machine of the class described comprising a rotary drum, a roller in contact with and for feeding a sheet of plastic material directly onto said drum the latter serving to initially curl said sheet into a curled body, and a relatively fixed compression-plate disposed over and separated from the drum to provide a passageway for the curled body the drum and compression-plate conjointly applying a pressure to the curled body as the same is advanced by said drum.

3. A machine of the class described comprising a rotary drum, a roller in contact with and for feeding a sheet of plastic material directly onto said drum the latter serving to initially curl said sheet into a curled body, and a compression plate mounted over and separated from the drum the space between said compression plate and drum presenting a passageway for the said body and the inner or entering end of the said plate being rounded and coöperative with the said drum to effect the final curling operation.

In testimony whereof I affix my signature in presence of two witnesses.

GEORGE E. GOWDY.

Witnesses:
 MARK HARDIN,
 HANNA ASKEW.